United States Patent
Devaraj et al.

(10) Patent No.: US 11,356,319 B2
(45) Date of Patent: Jun. 7, 2022

(54) DISTINGUISHING NETWORK VS SERVER ISSUES WHEN DIAGNOSING APPLICATION PERFORMANCE PROBLEMS

(71) Applicant: Arista Networks, Inc., Santa Clara, CA (US)

(72) Inventors: Naveen Kumar Devaraj, San Jose, CA (US); Rajshekhar Biradar, Karnataka (IN); Vijay Rangarajan, Karnataka (IN); Padmanabh Ratnakar, Karnataka (IN); Gagandeep S. Arneja, San Francisco, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/019,016

(22) Filed: Sep. 11, 2020

(65) Prior Publication Data

US 2022/0086035 A1    Mar. 17, 2022

(51) Int. Cl.
*G06F 15/173* (2006.01)
*H04L 41/0631* (2022.01)
*H04L 43/0882* (2022.01)
*H04L 43/0817* (2022.01)
*H04L 43/10* (2022.01)

(52) U.S. Cl.
CPC ...... *H04L 41/0631* (2013.01); *H04L 43/0817* (2013.01); *H04L 43/0882* (2013.01); *H04L 43/10* (2013.01)

(58) Field of Classification Search
CPC . H04L 41/0631; H04L 43/0882; H04L 43/10; H04L 43/0817
See application file for complete search history.

(56) References Cited

U.S. PATENT DOCUMENTS

| | | | |
|---|---|---|---|
| 2007/0011277 A1* | 1/2007 | Neff | H04N 19/85 709/218 |
| 2017/0302554 A1* | 10/2017 | Chandrasekaran | H04L 47/11 |
| 2018/0019815 A1* | 1/2018 | Miyabe | H04B 10/07953 |
| 2020/0120029 A1* | 4/2020 | Sankaran | H04L 45/48 |
| 2020/0396320 A1* | 12/2020 | Clemm | H04L 47/00 |
| 2020/0412633 A1* | 12/2020 | Song | H04L 45/16 |
| 2021/0135967 A1* | 5/2021 | Iorga | H04L 41/0886 |

* cited by examiner

*Primary Examiner* — Anh Nguyen
(74) *Attorney, Agent, or Firm* — Fountainhead Law Group P.C.

(57) ABSTRACT

A facility to determine if performance issues between two host computers in a data network includes a central controller identifying endpoints of a flow path between the two hosts. The central controller communicates with endpoint network devices to initiate telemetry tagging traffic on the flow path. A collector receives telemetry communicated in a packet from network devices on the flow path. A network operator can view the collected telemetry to assess whether the performance issue is in the network or not.

18 Claims, 9 Drawing Sheets

DISTINGUISHING NETWORK VS SERVER ISSUES WHEN DIAGNOSING APPLICATION PERFORMANCE PROBLEMS

BACKGROUND

A common problem in network operations is troubleshooting application performance issues. Application performance directly impacts a user's quality of experience. Such issues can either be server or network related. For example, server-related issues can arise due to insufficient Central Processing Unit (CPU) bandwidth and/or memory resources on the server end. Network-related issues can arise due to network packet drops leading to Transmission Control Protocol (TCP) retransmits, congestion along the traffic path, etc. Troubleshooting and characterizing the issues as being on the network vs. on the server can be a challenging and time consuming task.

In network operations circles, there is an old adage that states "the network is guilty until proven innocent." Touching all infrastructure components, compute, storage, virtualization, applications, etc., the network plays a fundamental role in Information Technology (IT) operations. With that scope, the network is the service that is expected to always be functioning. When an IT issue arises, the network is almost always a suspect and is often the first entity to be blamed.

Network operators tend to follow a manual box-by-box troubleshooting approach to root-cause the problem, which involves the following steps:

Trace the traffic path to identify a list of network devices along the traffic path of interest. Each network device is then further investigated. However, the presence of Link Aggregation Group (LAG) and/or Equal Cost Multipath (ECMP) and/or Layer 2 (L2) overlays along the traffic path can add complexity to this process.

On each network device identified, the network operator can look for packet drops due to Cyclic Redundancy Check (CRC) errors, buffer tail drops, etc. along the flow path. The network operator can review congestion metrics and other metrics (telemetry) captured by the network device to determine or otherwise assess a cause of the noted performance issue. In a large data network, this can be a time consuming task. Correlating the telemetry gathered from each network device to the flow in question can further complicate the process.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
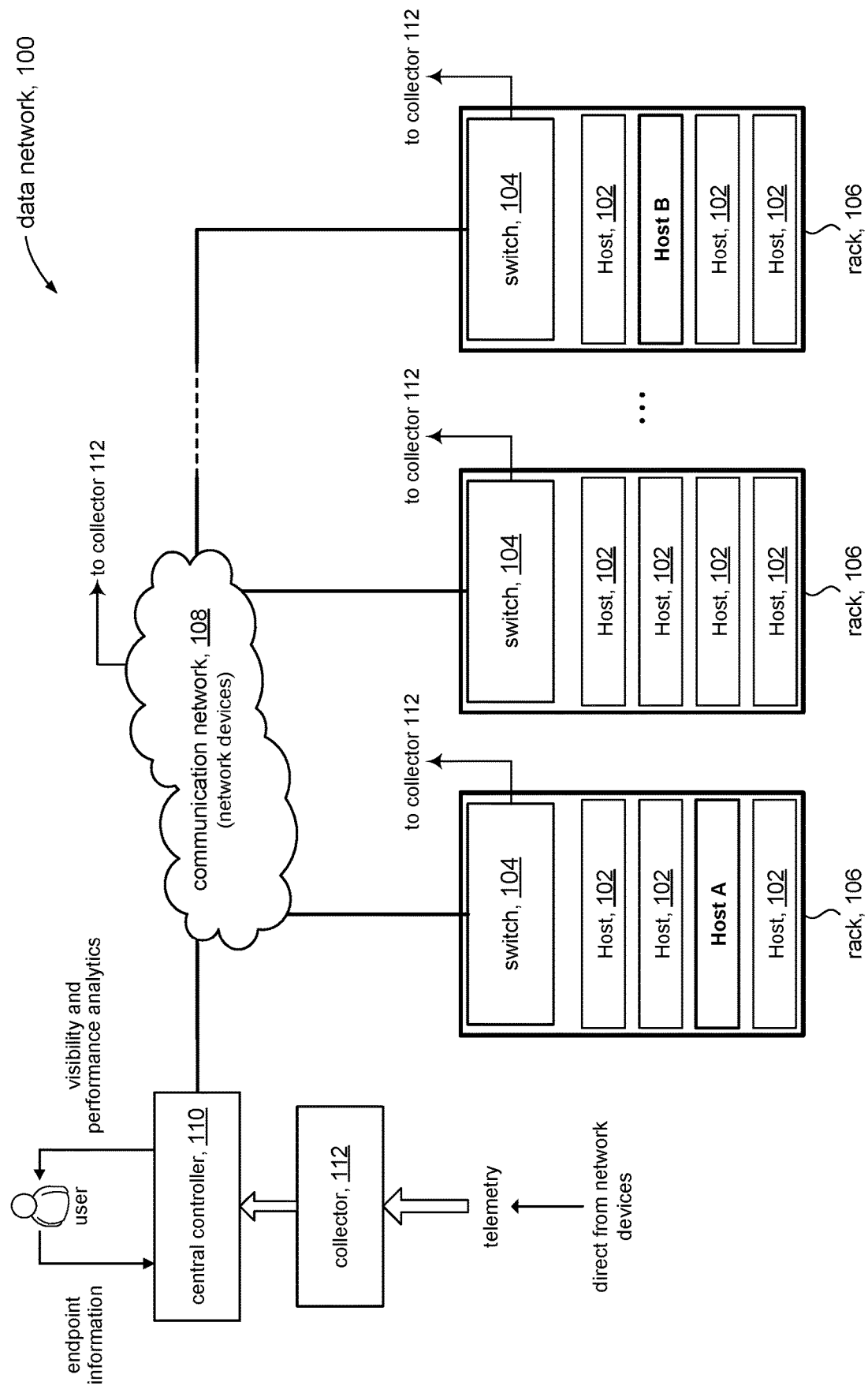
FIG. 1 shows an illustrative data network in accordance with the present disclosure.

FIG. 1 illustrates a data network in accordance with the present disclosure. As shown in FIG. 1, data network 100 generally can include a collection of computing and networking equipment designed for the purpose of managing and providing data to its users. Instances of data network 100 can support dozens, to hundreds, to thousands of users. In some embodiments, for example, data network 100 can be a data center where computing and networking equipment can be configured in a Local Area Network (LAN). In other embodiments, data network 100 can be a campus network that spans a wider area than a LAN, and may comprise several LANs. In other embodiments, data network 100 can be an enterprise network comprising a large network of computers and storage systems defined by several LANs and wide-area networks (WANs).

Data network 100 can include host machines 102 that can be communicatively connected to respective switches 104. In some embodiments, host machines 102 can be configured in racks 106. The host machines 102 in a rack can be connected to a corresponding switch, which can be referred to as a Top of Rack (ToR) switch. Switches 104 can provide networking functionality such as routing, bridging, Layer 2 aggregation, and so on, and can support application services such as data, voice, video, and the like. A switch in a given rack includes physical ports to which host machines 102 in that rack can physically or otherwise directly connect; for example, by wired connections (e.g., Ethernet). Switches 104 can be interconnected by communication network 108. In some embodiments, communication network 108 can include any suitable collection of equipment (e.g., network devices such as switches, routers, etc.) and cabling (e.g., copper wire, fiber optics, etc.) that function to communicatively interconnect switches 104.

Data network 100 can include management modules to manage the network. Central controller 110, for example, can automate network operations, such as network device provisioning, compliance, change management, network monitoring, and so on. Arista Networks' CloudVision® network management platform, for instance, is an example of a central controller that provides network-wide support for workload orchestration and workflow automation.

In accordance with the present disclosure, central controller 110 can be configured to provide facilities to troubleshoot performance issues. Collector 112 can collect telemetry to support a troubleshooting session. It is understood that in some embodiments, although not shown in FIG. 1, collector 112 can be a module in central controller 110. As depicted in FIG. 1, in accordance with the present disclosure, each network device can transmit or otherwise provide its locally generated telemetry directly to collector 112. These aspects of the present disclosure are discussed in more detail below.

In operation, a user such as a network operator can access central controller 110 to troubleshoot performance issues experienced by a pair of communicating hosts in the data network. To illustrate, suppose performance issues between Host A and Host B have arisen. The network operator can identify Host A and Host B as communication endpoints. In accordance with the present disclosure, central controller 110 can initiate telemetry collection activity among the network devices along the packet flow path between the endpoints, namely Host A and Host B. Telemetry can be provided directly to collector 112. In some embodiments, collector 112 can provide the collected telemetry to central controller 110. The collector or the central controller can report to the user various analytics generated from the collected telemetry in order to facilitate the user's effort in isolating a cause of the performance issue(s), whether in the network (e.g., in a network device along a flow path between endpoint hosts, Host A and Host B) or not.

Figure 2:
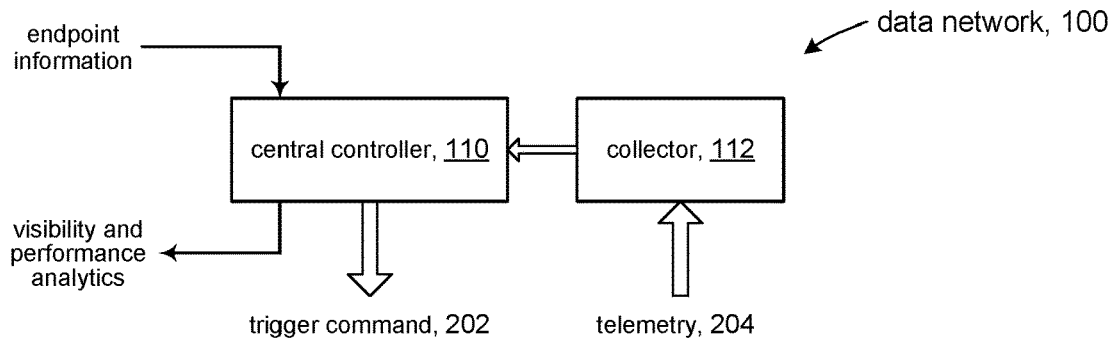
FIG. 2 shows details of an illustrative data network in accordance with the present disclosure.
Figure 2:
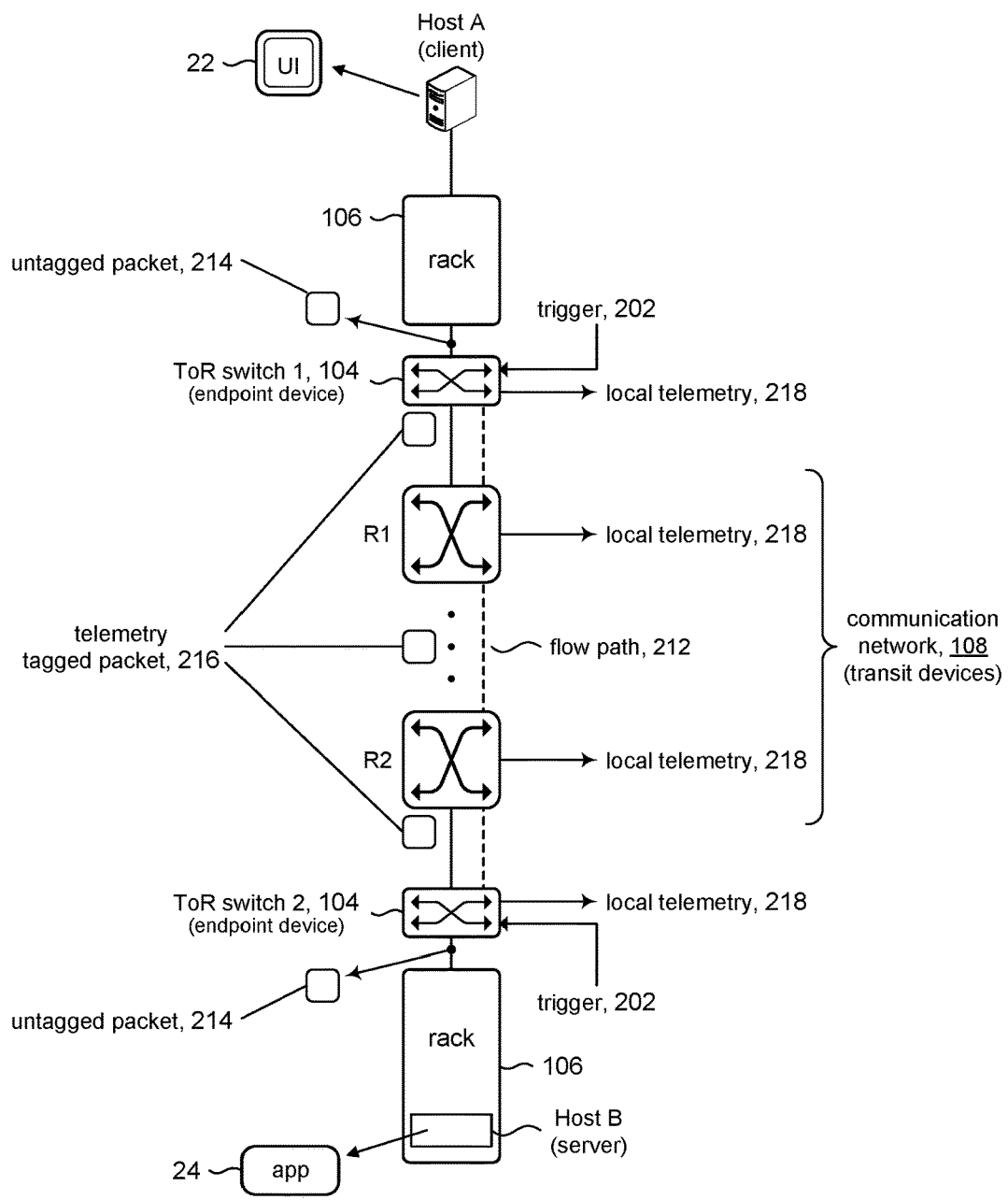

FIG. 2 illustrates details of data network 100, in accordance with some embodiments of the present disclosure, for collecting network information in connection with troubleshooting performance issues experienced by endpoint host machines (e.g., Host A, Host B, FIG. 1). Host A and Host B are shown in FIG. 2 as examples to illustrate aspects of a data collection session in accordance with the present disclosure to troubleshoot performance issues experienced between endpoint hosts. Suppose for discussion purposes, and without loss of generality, Host A is a client and Host B is a server. The figure shows that the client (Host A) can access application 24 executing on the server (Host B) via User Interface (UI) 22.

Central controller 110 can receive endpoint information associated with Host A and Host B to initiate a troubleshooting session to assess performance issues experienced by the endpoint host machines. In accordance with the present disclosure, central controller 110 can issue trigger command 202 to switches 104 to which Host A and Host B are respectively connected; e.g., ToR switch 1 and ToR switch 2. As explained in more detail below, trigger command 202 can signal or otherwise cause ToR switches 1 and 2 to begin tagging traffic flow on flow path 212 between Host A and Host B to initiate data collection. In accordance with the present disclosure, (untagged) packets 214 transmitted from one host to the other host can be tagged by the transmitting ToR switch to produce traffic comprising tagged packets 216. For example, ToR switch 1 can tag packets 214 received from Host A (e.g., packets transmitted by Host A to Host B). Likewise, ToR switch 2 can tag packets 214 received from Host B (e.g., packets transmitted by Host B to Host A). Additional details of this aspect of the present disclosure are discussed below.

In accordance with the present disclosure, the network devices can transmit respective locally generated telemetry 218 directly to collector 112 in response to receiving tagged packets 216. For example, network devices comprising communication network 108 (e.g., R1, R2) can transmit respective telemetry 218 to collector 112 when they receive tagged packets 216 that originate from Host A and tagged packets that originate from Host B. Locally generated telemetry 218 from each network device is received by collector 112, collectively, as telemetry 204. As used herein, the term "tag" and variants such a "tags", "tagged", and "tagging" will be understood as being used in connection with the local telemetry generated in a network device, including initiating, generating, collecting, and transmitting the locally generated telemetry.

When ToR switch 1 receives tagged packets 216 from communication network 108 (e.g., when Host B transmits tagged packets to Host A), the ToR switch can transmit its locally generated telemetry 218 to collector 112. In addition, ToR switch 1 can un-tag the packet before transmitting the packet to Host A. Likewise, when ToR switch 2 receives tagged packets 216 from communication network 108 (e.g., when Host A transmits tagged packets to Host B), the ToR switch can transmit its locally generated telemetry 218 to collector 112. In addition, ToR switch 2 can un-tag the packet before transmitting the packet to Host B.

In accordance with the present disclosure, telemetry 218 is transmitted directly to collector 112. In some embodiments, for example, a network device can have a physical connection to collector 112; e.g., a copper wire, optical fiber, and the like. In some embodiments, a network device can communicate directly with collector 112 wirelessly; e.g., using a Bluetooth® transmission. The telemetry can be transmitted in data packets from the network device to collector 112 over the wired or wireless connection. In some embodiments, a network device can communicate its locally generated telemetry 218 by encapsulating the telemetry in an Internet protocol (IP) data packet and transmitting the IP packet to collector 112.

Figure 3A:
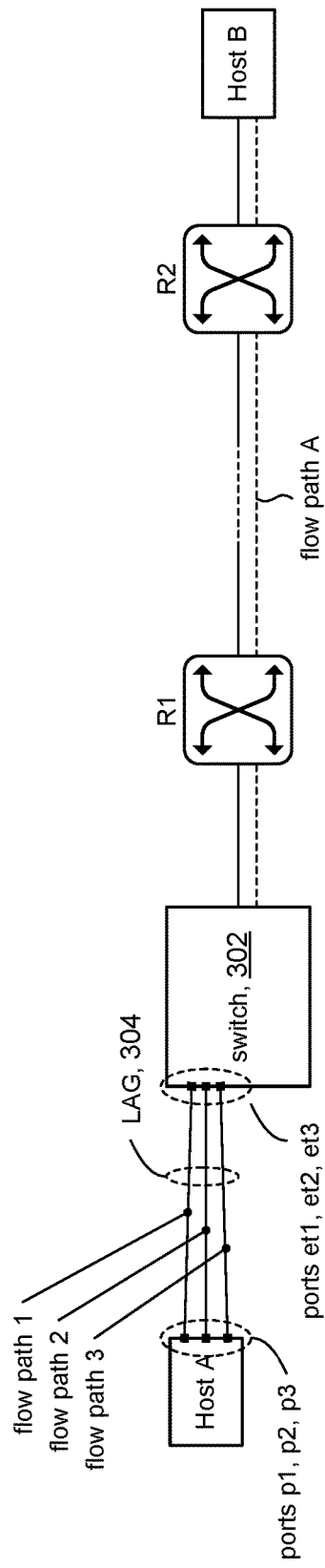
FIGS. 3A and 3B illustrate examples of multiple path flows between endpoints.
Figure 3B:
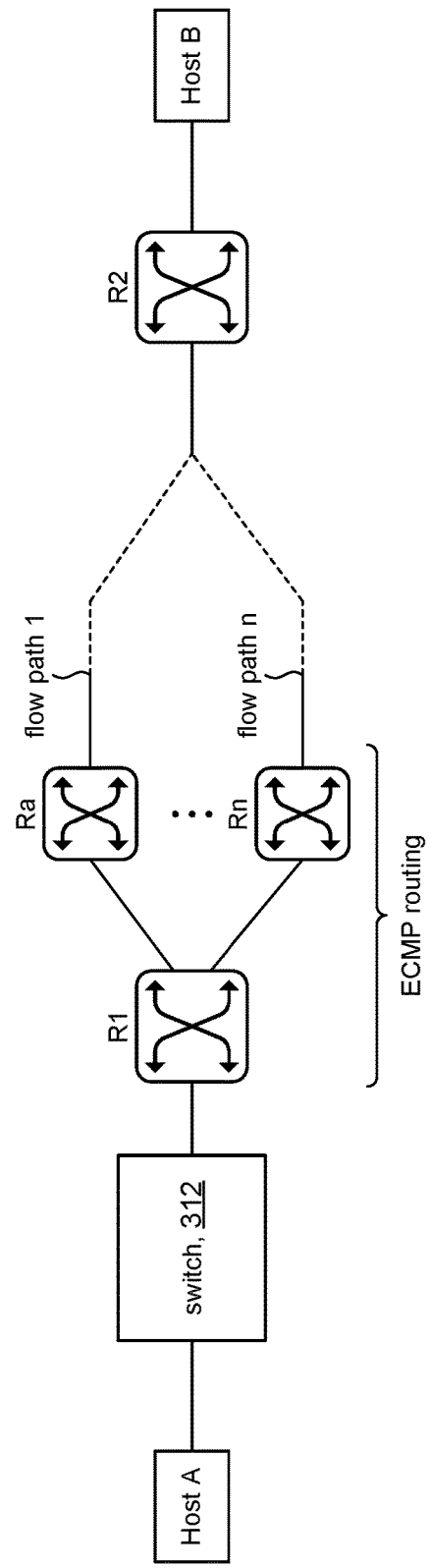

FIGS. 3A and 3B show that more than one flow path can form between two hosts. The configuration depicted in FIG. 2 shows a single flow path 212 between Host A and Host B. However, as illustrated in FIGS. 3A and 3B, there are configurations in which traffic between Host A and Host B can flow along multiple paths. The configuration in FIG. 3A, for instance, shows Host A connected to switch 302 using a known and frequently used switching strategy called link aggregation. A switch configured for link aggregation combines multiple physical links into a single logical link called a Link Aggregation Group (LAG). Host A is shown connected to switch 302 via LAG 304, which is defined by switch ports et1, et2, et3. Although LAG 304 logically represents a single connection between Host A and switch 302, LAG 304 physically comprises three separate flow paths. Traffic between Host A and Host B can flow along three different paths: one flow path consists of flow path A and flow path 1, another flow path is defined by flow path A and flow path 2, and the third flow path comprises flow path A and flow path 3. Although not shown, multiple flow paths between Host A and Host B can also arise when Host A is connected in a variant of LAG called multi-chassis LAG (MLAG) where the logical connection connects Host A to multiple (e.g., two) switches.

FIG. 3B shows an example of a known and common routing strategy referred to as Equal Cost Multipath (ECMP) routing. A router (e.g., R1) configured for ECMP can forward packets that target a given destination along multiple paths of equal cost. Accordingly, by operation of ECMP, traffic flow between Host A and Host B can result in multiple paths.

As noted above, manual troubleshooting involves box-by-box data collection, where the network operator manually retrieves data from each network device on the flow path in question. It can be appreciated from the discussion above that the presence of LAGs and ECMP routing in the flow path can significantly increase the data collection effort. The network operator needs to inspect each LAG-enabled switch to identify which port the flow path passes through, and likewise with each ECMP-enabled router, in order to collect the telemetry that is associated with the flow in question. It will be appreciated that the present disclosure can significantly facilitate the data collection component of the troubleshooting process.

The discussion will now turn to processing in the various components of data network 100 to troubleshoot performance issues between two host machines in accordance with the present disclosure. The following descriptions will use host machines Host A and Host B and ToR switch 1 and ToR switch 2 as examples.

Figure 4:
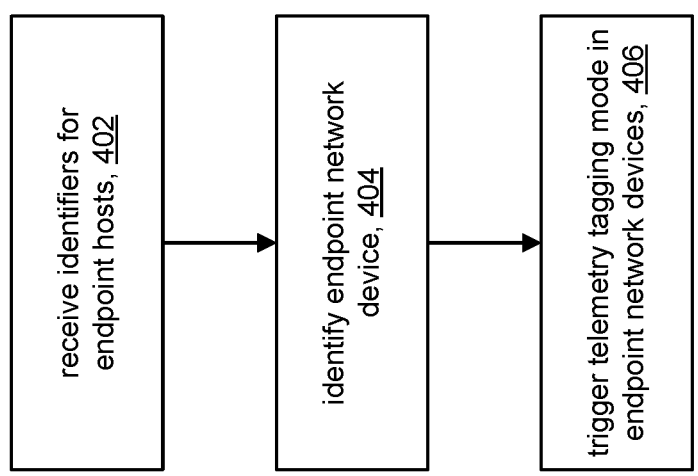
FIG. 4 shows operations in a central controller in accordance with the present disclosure.

FIG. 4 illustrates a high level description of operations and processing in accordance with the present disclosure, performed by a central controller (e.g., 110, FIG. 1) in a data network (e.g., 100, FIG. 1) to facilitate troubleshooting performance issues between host machines operating in the data network. In some embodiments, for example, the central controller can include computer executable program code, which when executed by one or more processors (e.g., 1402, FIG. 14), can cause the central controller to perform processing in accordance with FIG. 4. The operation and processing blocks described below are not necessarily executed in the order shown, and can be allocated for execution among one or more concurrently executing processes and/or threads.

At operation 402, the central controller can receive identifiers for endpoint host machines (e.g., Host A and Host B) between which a performance issue has arisen. For example, user(s) may experience some issues when executing applications on Host A and Host B that communicate with each other. In a client/server use case, for instance, the server may experience reduced processing or memory bandwidth, reduced storage capacity, and so on. Network devices in the data network (e.g., switches and routers) that support traffic flow between client and server may experience network packet drops leading to Transmission Control Protocol (TCP) retransmits, congestion along the traffic path, and so on. A user on the client side, however, may simply experience a slow response time from the server or no response at all.

The user may report this experience to the network operator. As an initial step in troubleshooting the issue, the network operator can determine if there are any issues in the traffic flow through the network between the endpoint hosts, in our example Host A and Host B. Packets transmitted on the network between Host A and Host B constitute the traffic flow of interest. In accordance with the present disclosure, the network operator can enter identifiers for the hosts at both endpoints of the communication, namely Host A and Host B. In some embodiments, for example, the host identifiers can be the respective IP addresses of the endpoint hosts. In the case that a host is a website, the host identifier for that host can be the website address (e.g., a fully qualified domain name, for instance, "website.com") of the website. Additional identifying information can include the Layer 4 (L4) source and port destinations, and so on.

At operation 404, the central controller can identify the endpoint network devices (nodes) to which the endpoint hosts are connected. For example, as illustrated in FIG. 2, Host A executes on a server in rack 106 and is connected to ToR switch 1. Likewise, Host B is connected to ToR switch 2. Network devices include devices that have ports (interfaces) to receive and transmit packets. A network device can receive a packet on one of its ports (ingress port) and transmit the packet on another of its ports (egress port) that is determined based on information contained in the received packet. Network devices include switches and routers.

In some embodiments, the central controller can store and manage configuration information that gives the central controller network-wide visibility of the data network. In some embodiments, for example, the central controller can maintain one or more Media Access Control (MAC) tables for all the switches in the data network. A MAC table provides a mapping between the MAC address of a computing device and the port on a switch to which the computing device is connected. The central controller can maintain Address Resolution Protocol (ARP) mapping tables that provide mappings between IP addresses and MAC addresses for all routers in the data network. The central controller can use these tables and other network-wide information to identify the endpoint network devices to which Host A and Host B are respectively connected. For example, in a typical use case, when an issue arises, the user may report only the IP addresses of the endpoints, namely Host A and Host B. The central controller can use the ARP tables to determine the MAC addresses corresponding to the endpoint IP addresses. The central controller can then use the MAC tables to determine that Host A is connected to a particular port on ToR switch 1 and likewise to determine that Host B is connected to a particular port on ToR switch 2.

At operation 406, the central controller can trigger a flow-based tagging mode in the identified endpoint network devices to begin tagging packets in the traffic flow of interest. In some embodiments, for instance, the central controller can transmit a trigger command (e.g., 202, FIG. 2) to each endpoint network device to turn on tagging in the network device. In accordance with the present disclosure, tagging is applied to traffic flow between the identified endpoint host machines (e.g., Host A, Host B) where packets transmitted between the endpoint hosts are tagged.

The trigger command can include the IP addresses of the endpoint hosts to tag traffic between the hosts. For example, the trigger command received by ToR switch 1 can include the IP address of Host A and the IP address of Host B so that the switch knows to tag packets sent by Host A to Host B, and likewise, the trigger command received by ToR switch 2 can include the IP address of Host A and the IP address of Host B to inform the switch to tag packets sent by Host B to Host A. The trigger command can include additional addressing information to tag only certain packets in the traffic flow of interest. For example, the trigger command can specify source and/or destination IP port numbers in addition to the source and destination IP addresses.

The trigger command can include information that identifies telemetry to be collected. As mentioned above, in accordance with the present disclosure when a network device receives a tagged packet, that network device can transmit certain telemetry to a collector (e.g., 112). In some embodiments, the trigger command can include a bit field that specifies the desired telemetry. For example, each bit in the bit field can correspond to a particular measurement that can be recorded or otherwise noted by the network device. This aspect of the present disclosure is explained in further detail below.

In some embodiments, the trigger command can be an instruction to program a packet processing rule in the endpoint network device to identify and tag packets comprising the traffic flow of interest (traffic flow rule). Generally, packet processing rules are used to classify packets and apply actions (rewrite actions) on matched packets. Packet processing rules can be stored in a lookup memory called a Ternary Content-Addressable Memory (TCAM). For example, the central controller can send a traffic flow rule to ToR switch 1 having match criteria that match on packets having a destination IP address of Host B. Similarly, central controller can send a traffic flow rule to ToR switch 2 having match criteria that match on packets having a destination IP address of Host A. The rewrite action associated with the traffic flow rules can be an action that tags the matched packet. Packet tagging in accordance with the present disclosure is further described below.

Referring briefly to FIG. 2, the figure illustrates how central controller 110 can initiate the process of collecting telemetry from the network devices in accordance with the operations described in FIG. 4 where the central controller sends trigger command 202 to endpoint devices ToR switch 1 and ToR switch 2.

Figure 5:
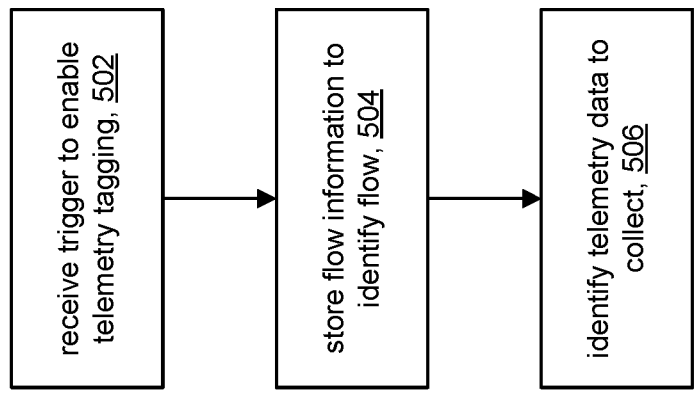
FIG. 5 shows operations in an endpoint network device in accordance with the present disclosure.

Referring to FIG. 5, the discussion will now turn to a high level description of operations and processing in accordance with the present disclosure performed by an endpoint network device (e.g., ToR switch 1) in a data network (e.g., 100, FIG. 1) to initiate packet tagging. In some embodiments, the endpoint network device can include one or more digital processing units, which when operated, can cause the endpoint network device to perform processing in accordance with FIG. 5. Digital processing units can include general Central Processing Units (CPUs) that operate by way of executing computer program code stored on a non-volatile computer readable storage medium (e.g., read-only memory, ROM). For example, CPU 1308 (FIG. 13) in the control plane can be a general CPU. Digital processing units can include specialized processors (e.g., in the data plane) such as field programmable arrays, application specific integrated circuits, etc. that operate by way of executing computer program code or operate by way of being configured for specific operations. For example, packet processor 1312*a* (FIG. 13) in the data plane can be a specialized processor. The flow of operations performed by the endpoint network device is not necessarily limited to the order of operations shown.

For discussion purposes, the endpoint network device ToR switch 1, connected to Host A, will be used as an example to illustrate the process. It will be understood, however, that the following operations apply to both endpoint network devices ToR switch 1 and ToR switch 2.

At operation 502, the endpoint network device can receive a trigger command from the central controller to enable tagging mode. As explained in more detail below, tagging involves tagging packets received from Host A for transmission to a given destination (e.g., Host B).

At operation 504, the endpoint network device can store in local memory the flow information contained in the received trigger command in order to identify the traffic flow to be tagged (the traffic flow of interest). Further detail is discussed below.

At operation 506, the endpoint network device can store in local memory a telemetry specifier contained in the received trigger command. The telemetry specifier can identify the specific telemetry to be collected. In some embodiments, for example, the telemetry specifier can be expressed as a bit field (bit pattern) in the trigger command where each "telemetry bit" corresponds to a particular metric or some static data in the network device. An example of telemetry bits is the following bitmap from the In-band Network Telemetry (INT) protocol (discussed in more detail below):

bit 0 switch ID
bit 1 ingress port ID
bit 2 hop latency
bit 3 queue occupancy
bit 4 ingress timestamp
bit 5 egress port ID
bit 6 queue congestion status
bit 7 egress port transmit utilization
etc.

In some embodiments, operations 504 and 506 can include generating a traffic flow rule to identify and tag packets in the traffic flow of interest. The traffic flow rule can be based on information contained in the received trigger command and programmed in a TCAM of the endpoint network device. The flow information contained in the received trigger command can be used to define the match condition of the traffic flow rule. The telemetry bits can be incorporated into the rewrite action associated with the traffic flow rule to tag matched packets (discussed below).

In some embodiments, for example, the endpoint network device can generate a traffic flow rule based on the flow information contained in the trigger command; e.g., IP addresses of the endpoint hosts (e.g., Host A, Host B). For example, to identify traffic from Host A to Host B, ToR switch 1 can program a traffic flow rule that matches on packets having a source IP address of Host A and a destination IP address of Host B. To identify traffic from Host B to Host A, ToR switch 2 can program a traffic flow rule that matches on packets having a source IP address of Host B and a destination IP address of Host A. As noted above, in some embodiments, a traffic flow rule can further match on source and/or IP ports.

In other embodiments, the traffic flow rule can be provided in the trigger command itself. For example, the central controller can generate the traffic flow rules and send them to the endpoint network devices in their respective trigger commands. Each endpoint network device can process the received trigger command by programming the traffic flow rule in its TCAM.

TCAMs and TCAM rules are known. Briefly, however, a TCAM rule comprises match criteria for matching packets and one or more actions that are invoked when the match criteria are met. The match criteria can match various data in a packet, including for example source and destination addresses, source and destination ports, protocol type, data in the payload, and so on. Action(s) include dropping a packet, redirecting a packet, rewriting one or more fields in a packet, logging a message, and so on. A TCAM rule can be expressed in the form of an IF-THEN statement:

IF <condition(s) are met>, THEN <perform action(s)>
where the conditions in the IF portion represent one or more match criteria and the THEN portion expresses the action(s) performed on a matched packet. In our example above, the traffic flow rule in ToR switch 1 can be expressed as:

IF <SIP==IP-A and DIP==IP-B>, THEN <TagPacket> where IP-A and IP-B are IP addresses of Host A and Hot B, respectively; and TAGPACKET is a rewrite action to tag the packet for telemetry which can include specifying the specific telemetry to be collected.

Figure 6:
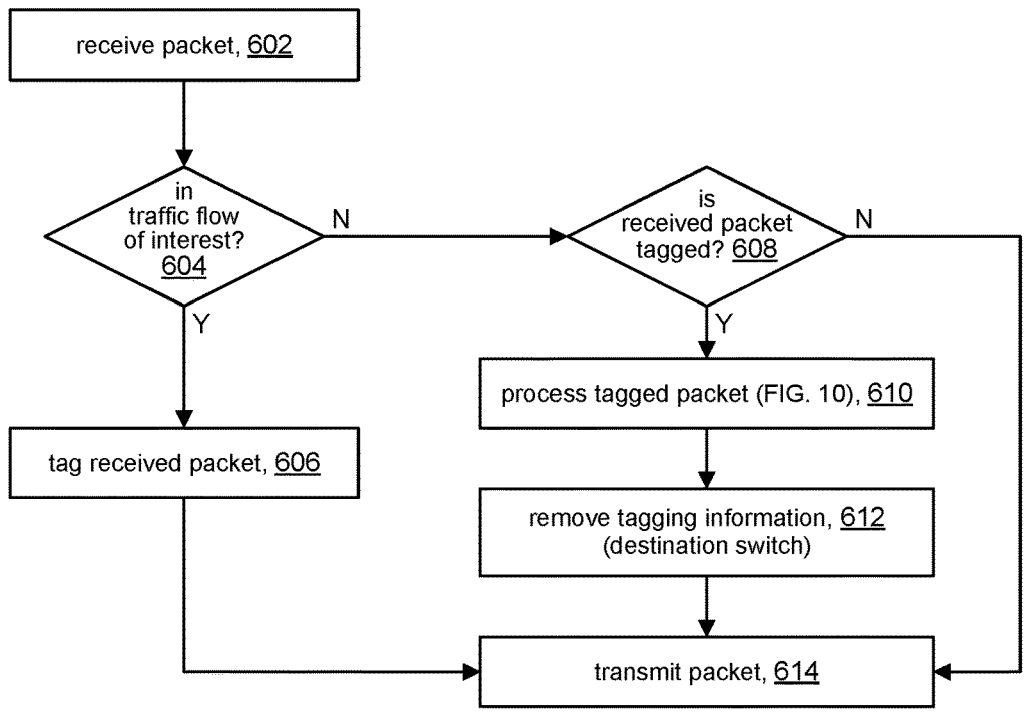
FIG. 6 shows processing of a packet in an endpoint network device in accordance with the present disclosure.
Figures 9, 10:
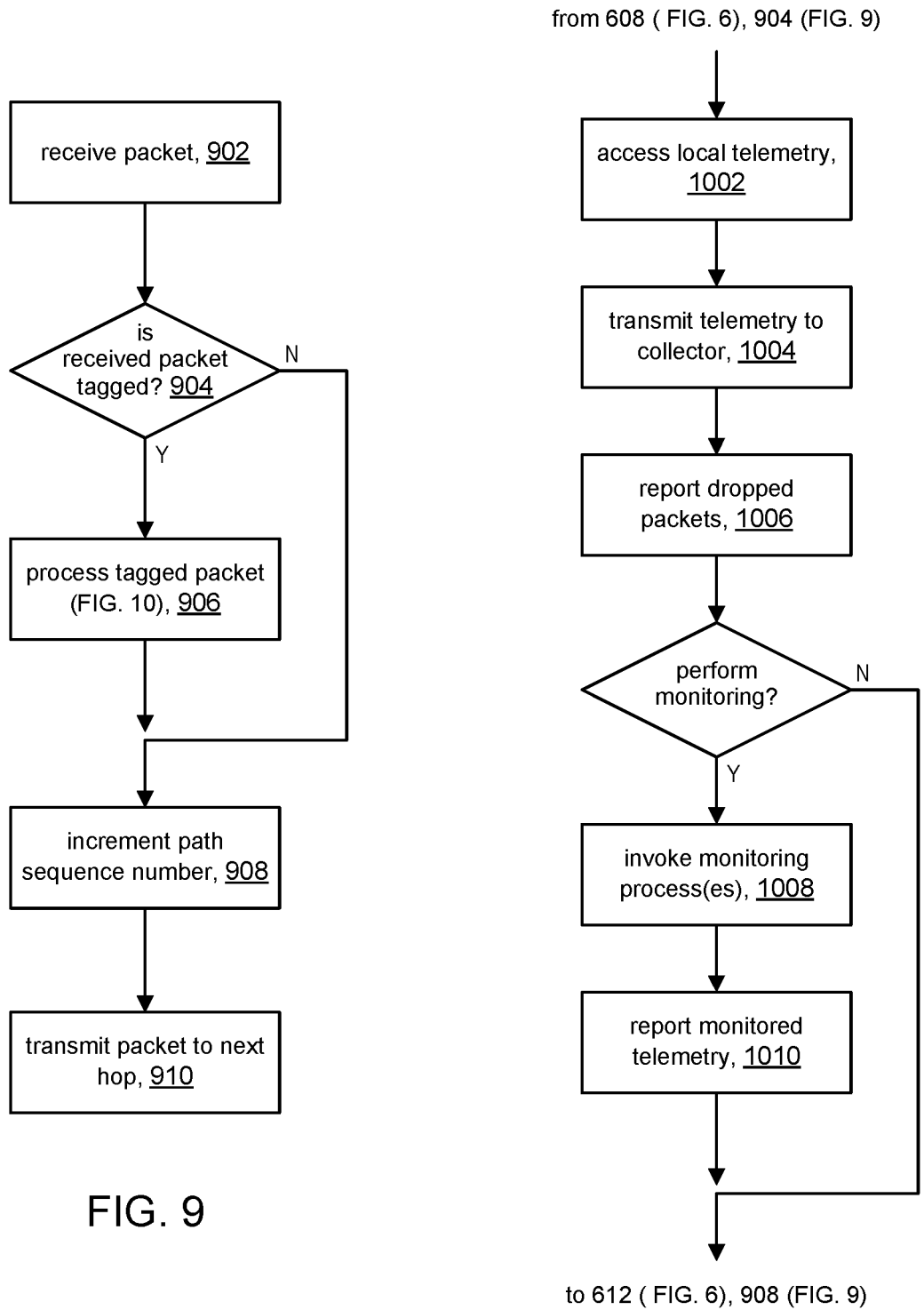
FIG. 9 shows processing of a packet in a transit network device in accordance with the present disclosure.
FIG. 10 shows processing of a telemetry-tagged packet by an endpoint device and by a transit device in accordance with the present disclosure.

Traffic between Host A and Host B can now be monitored in accordance with the present disclosure. Referring to FIG. 2, for instance, traffic between Host A and Host B will be generated, as a client on Host A interacts with the server on Host B. The traffic comprises packets transmitted from Host A to Host B and packets transmitted from Host B to Host A. The traffic will be processed according to FIGS. 6, 9, and 10. Briefly, FIG. 6 describes the initial tagging of packets by endpoint network devices ToR switch 1 and ToR switch 2 when they receive packets from their respective hosts. FIG. 6 also describes the handling of tagged packets received by the endpoint network devices. FIG. 9 describes the handling of tagged packets by transit network devices. FIG. 10 describes the processing of tagged packets that is performed by endpoint devices and by transit devices.

Referring to FIGS. 6, 7A, 7B, and 8, the discussion will now turn to a high level description of operations and processing in accordance with the present disclosure performed by an endpoint network device (e.g., ToR switch 1) in a data network (e.g., 100, FIG. 1) to process a received packet. In some embodiments, the endpoint network device can include one or more digital processing units (described above in connection with FIG. 5), which when operated, can cause the endpoint network device to perform processing in accordance with FIG. 6. The flow of operations performed by the endpoint network device is not necessarily limited to the order of operations shown.

For discussion purposes, the endpoint network device ToR switch 1, connected to Host A, will be used as an example to illustrate the process. It will be understood, however, that these operations apply to both endpoint network devices (e.g., ToR switch 1 and ToR switch 2).

At operation 602, the endpoint network device can receive an ingress packet. Referring to ToR switch 1 shown in FIG. 2 for example, the switch can receive outgoing (upstream) packets from Host A for transmission to communication network 108, or incoming (downstream) packets from the communication network.

At operation 604, the endpoint network device can make a determination whether the received packet is a packet in the traffic flow of interest. As mentioned above, in some embodiments, the endpoint network device can include a traffic flow rule to identify packets in the traffic flow of interest. For example, to identify traffic from Host A to Host B, the traffic flow rule can match on packets having a source IP equal to Host A and a destination IP address of Host B. To identify traffic from Host B to Host A, the traffic flow rule can match on packets having a source IP of Host B and a destination IP address of Host A. If the received packet is a packet in the traffic flow of interest, then processing can continue at operation 606 to tag the received packet. If the received packet is not a packet in the traffic flow of interest, then processing can continue to decision point 608 for transmission to the next hop.

At operation 606, the endpoint network device can tag the received packet. In accordance with some embodiments, this operation can be the result of invoking the rewrite action (e.g., TAGPACKET) associated with a traffic flow rule that matched the received packet. In accordance with some embodiments, packets can be tagged based on the In-band Network Telemetry (INT) framework, a monitoring strategy originated by the P4 Language Consortium. The INT protocol is described in a publication entitled "In-band Network Telemetry (INT)" authored by Kim et al. (June 2016) and is incorporated herein by reference for all purposes.

Figure 7A:
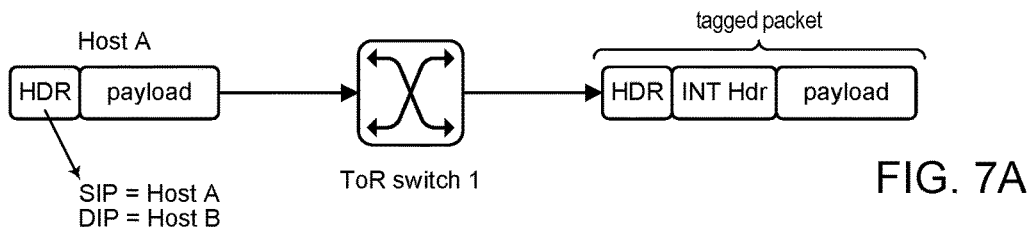
FIGS. 7A and 7B illustrate tagging and untagging a packet for telemetry in accordance with the present disclosure.
Figure 8:
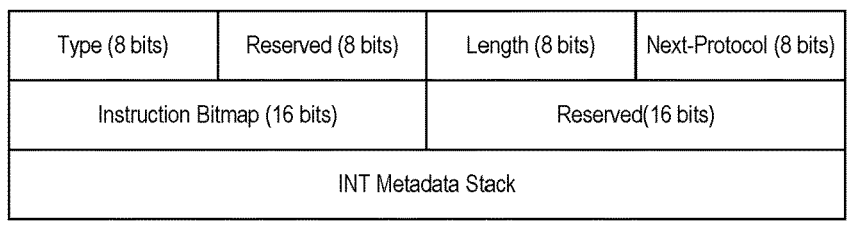
FIG. 8 shows an example of a telemetry tag in accordance with the present disclosure.

In accordance with some embodiments, the endpoint network device can tag a packet by incorporating an INT header to the packet. Referring for a moment to FIG. 7A, when ToR switch 1 (an endpoint network device) receives a packet from Host A that is going to Host B, the switch can "tag" the packet by incorporating an INT header to the packet. FIG. 8 shows an example of an INT header in accordance with the INT protocol. The 16-bit INSTRUCTION BITMAP component represents the telemetry bits that identify the telemetry to be collected. As noted above, each telemetry bit can represent a metric or other data that is provided to the collector (e.g., 112). Although the INT header will be used as our example for tagging packets, it will be appreciated that in other embodiments, packets can be tagged using a data format other than an INT header.

In accordance with the present disclosure, the endpoint network device can further tag the packet by incorporating a path sequence number in the packet, for example, in the INT header. In some embodiments, the path sequence number can be initialized to '1'. As explained below, the path sequence number is incremented at each hop along the flow path between endpoint network devices. The initial value of '1' can be viewed as indicating the first hop in the sequence. This aspect of the present disclosure is discussed below. In short, the path sequence number can be used by the collector to infer the sequence of local telemetry collected from the network devices in the flow path between the endpoint network devices.

Referring briefly to FIG. 2, the figure illustrates each endpoint network device ToR switch 1 and ToR switch 2 transmitting tagged packets in accordance with operations described in above operation 606 where reach endpoint device receives untagged packets 214 and produces tagged packets 216 which include the telemetry bits and a path sequence number.

Returning to FIG. 6, the discussion resumes with operation 608 from the N branch of decision point 604. At operation 608, the endpoint network device can determine whether the received packet is tagged. For example, an endpoint network device (e.g., ToR switch 1) can receive a tagged packet that was sent from the other endpoint device (e.g., ToR switch 2). If the received packet is tagged (e.g., matches the pre-programmed INT rule), then processing can continue at operation 610. If the received packet is not tagged, then processing can continue at operation 614.

In accordance with some embodiments, network devices in the data network, including endpoint network devices (e.g., ToR switch 1, ToR switch 2), can be pre-programmed with a packet processing rule that matches for an INT header (an INT rule). The endpoint network device can determine whether the received packet is tagged using an INT rule. The rule can match on a bit pattern that identifies the INT header. For example, if the INT header is placed after the Layer 3 (L3) header, the "IP protocol" bits would indicate the presence of the INT header. For illustration purposes, the INT rule can be expressed as:

IF <INT Condition>, THEN <ProcessTaggedPacket> where INT CONDITION can be a bit in the protocol field in the IP header that indicates the presence of an INT header; and PROCESSTAGGEDPACKET is an action for processing a tagged packet. In accordance with some embodiments, all packets can be tagged using the same INT header so all tagged packets will have the same telemetry bits. Accordingly, the same INT rule can be programmed in all the network devices in the data network, including endpoint devices and transit devices. In addition, as explained below, tagged packets are processed in the same way by the network devices, namely in accordance with FIG. 10, whether the tagged packet is received by an endpoint network device or a transit network device.

At operation 610, the endpoint network device can process a received packet that has been tagged. Details for processing a tagged packet in accordance with the present disclosure are discussed below in FIG. 10 to process local telemetry collected by the endpoint device.

Figure 7B:
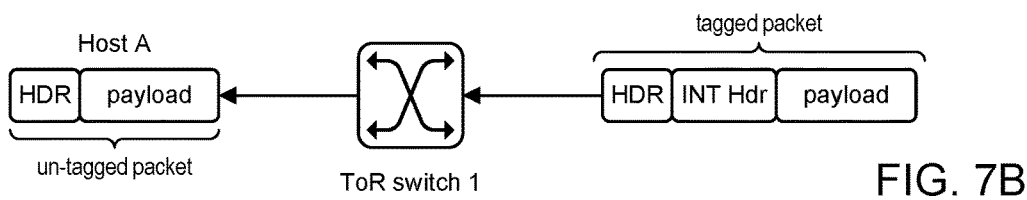

At operation 612, the endpoint network device can remove the tagging information (un-tag) from the tagged packet. As noted above an endpoint network device (e.g., ToR switch 1) can receive a tagged packet that was initiated from the other endpoint (e.g., ToR switch 2). At this point in the traffic flow, the received tagged packet has reached its destination (e.g., Host A) so the tagging information can be removed before transmitting the packet to the destination. FIG. 7B illustrates an example of an untagging sequence where ToR switch 1 is the destination ToR that receives a tagged packet from Host B. ToR switch 1 removes the INT header from the tagged packet before transmitting the packet to Host A.

A network device can learn if its port is connected to a host or to another network device for untagging purposes. In some embodiments, for example, network devices in accordance with the present disclosure can advertise INT capability information to each other in a manner similar to the Link Layer Discovery Protocol (LLDP). Accordingly, if a network device receives INT capability information over a given port, then the network device can deem that port to be connected to an INT-capable network device; otherwise, the network device can conclude the port is connected to a host. This allows the network device to determine whether to untag a packet or not depending on whether the egress port is connected to another network device or to a host. In other words, if the egress port is an INT-edge interface connected to a host, then the packet can be subject to INT termination operations, which may include untagging a tagged packet, for example, by removing the INT header.

At operation 614, the endpoint network device can transmit the packet. If the packet was received from the host, then the packet will be transmitted upstream to the communication network; the packet will either be tagged via operation 606 or not tagged (N branches of operations 604 and 608). If the packet was received from the communication network, then the packet will be transmitted downstream to the host connected to the endpoint network device (e.g., Host A).

Referring to FIG. 9, the discussion will now turn to a high level description of operations and processing in accordance with the present disclosure performed by a transit network device (e.g., R1, R2, FIG. 2) in a data network (e.g., 100, FIG. 1) to process a received packet. As illustrated in FIG. 2, a transit device is a network device along a flow path between the endpoint network devices (e.g., ToR switch 1, ToR switch 2). As shown in FIGS. 3A and 3B, several flow paths may arise between the endpoint network devices. Accordingly, each flow path can be associated with a different set of transit devices. A transit device can be defined based on a port in a switch. In the LAG configuration shown in FIG. 3A, for example, ports et1, et2, and et3 on switch 302 can constitute three transit devices because they are in separate flow paths and have respective metrics. In some embodiments, the transit network device can include one or more digital processing units (described above in connection with FIG. 5), which when operated, can cause the transit network device to perform processing in accordance with FIG. 9. The flow of operations performed by the transit network device is not necessarily limited to the order of operations shown.

At operation 902, the transit device (e.g., R1) can receive a packet. The received packet, for example, can be a packet in transit from Host A to Host B, or a packet in transit from Host B to Host A.

At operation 904, the transit device can determine whether the received packet is tagged or not tagged. As explained above, in accordance with the present disclosure, network devices in the data network can be programmed with an INT rule to identify packets containing the INT header. Accordingly, the INT rule programmed in the TCAM of the transit device can be used to determine whether or not the received packet is tagged. If the received packet is tagged, then processing can proceed to operation 906. If the received packet is not tagged, then processing can proceed to operation 908.

At operation 906, the transit device can process a received packet that has been tagged. Details for processing a tagged packet in accordance with the present disclosure are discussed below in FIG. 10 to process local telemetry collected by the transit device.

At operation 908, the transit device can increment the path sequence number that is incorporated in the tagged packet. Recall from above that in some embodiments a path sequence number can be incorporated in the INT header as part of tagging a packet. In accordance with some embodiments, the transit device can update the path sequence number contained in the INT header, for example, by incrementing the value of the path sequence number so that the path sequence number increases with each hop along the flow path. This aspect of the present disclosure is discussed below.

At operation 910, the transit device can transmit the received packet to the next hop device. Because the telemetry is transmitted directly to the collector per FIG. 10, the INT header does not need to be modified to incorporate any telemetry. If the next hop device is an endpoint device, then the packet can be handled according to the operations in FIG. 6. If the next hop device is a transit device, then the packet can be handled according to the operations in FIG. 9.

Referring to FIG. 10, the discussion will now turn to a high level description of operations and processing in accordance with the present disclosure performed by a network device in a data network to process a tagged packet. A tagged packet is processed in the same way whether the network device is an endpoint device or a transit device; see for example, operation 610, FIG. 6 for an endpoint device and operation 906, FIG. 9 for a transit device. In some embodiments, the network device can include one or more digital processing units (described above in connection with FIG. 5), which when operated, can cause the network device to perform processing in accordance with FIG. 10. The flow of operations performed by the network device is not necessarily limited to the order of operations shown.

At operation 1002, the network device can access its locally generated telemetry in accordance with the telemetry bits in the tagged packet. A network device can maintain various local counters and other metrics (collectively referred to as telemetry) relating to the receiving, processing, and transmission of packets. As explained above, the tagged packet can include telemetry bits that specify the counters and other metrics of interest. For example, the packet can be tagged with an INT header in accordance with the INT protocol. The network device can access the locally generated counters and other metrics according to the telemetry bits comprising the 16-bit INSTRUCTION BITMAP component contained in the INT header. Recall from above that the telemetry bits include:

- bit 0 switch ID
- bit 1 ingress port ID
- bit 2 hop latency
- bit 3 queue occupancy
- bit 4 ingress timestamp
- bit 5 egress port ID
- bit 6 queue congestion status
- bit 7 egress port transmit utilization Merely to illustrate, suppose the bitmap is 11110010, where bit 0 is the left-most bit. The access telemetry, according to this example bitmap, would include the switch ID, ingress port ID, hop latency, queue occupancy, and queue congestion status.

In some embodiments, the accessed telemetry can include the path sequence number contained in the tagged packet. As will be explained below, the path sequence number can be used to infer the proper sequence of local telemetry collected from the network devices in the flow path between the endpoint network devices.

At operation 1004, the network device can transmit the accessed telemetry directly to the collector (e.g., 112) in response to receiving the tagged packet. In some embodiments, for example, the network device may have a physical communication channel to the collector, such as copper wire, optical fiber, and so on so that the accessed telemetry can be physically directly transmitted to the collector in the sense that the telemetry can be modulated onto a physical medium that is connected to the collector. Similarly, in other embodiments, the network device can be wirelessly connected to the collector for direct communication with the collector.

In other embodiments, the network device can transmit the accessed telemetry directly to the collector by communicating the accessed telemetry in an IP packet that is addressed to the collector; e.g., the destination IP is the IP of the collector. Although there can be several intermediate routing/switching elements along a path between the network device and the collector, the telemetry-bearing packet is nonetheless deemed being sent "directly" to collector because the packet is addressed to the collector. The intermediate routing/switching elements simply provide Layer 2/Layer 3 forwarding of the packet to the collector, and do not process the telemetry contained in the payload of the packet.

Compare the passing of telemetry in accordance with the INT protocol, where the telemetry at each hop is appended to the INT header of the packet. Because the telemetry is appended to the INT header rather than being sent to the collector, the INT header increases in size with each hop. It is not until the packet reaches the INT destination (sink) node where the telemetry is extracted at the sink node and provided to a collector. Transmitting telemetry directly to the collector avoids the ballooning effect that the INT protocol has on packets in transit. Moreover, because packets are processed in the data plane, processing the INT header in accordance with the INT protocol can degrade packet forwarding performance as the header increases in size with each hop. This can lead to artificially degraded performance measurements (e.g., increased latency) due to the overhead created by processing the INT protocol. Transmitting telemetry directly to the collector avoids the overhead which can ensure more accurate performance metrics. Also, if a packet is dropped in the network before it reaches the INT sink node, the accumulated telemetry will be lost which can impede the fault diagnosis at the collector. Transmitting telemetry directly to the collector reduces the risk of losing telemetry due to packet drops.

Referring briefly to FIG. 2, the figure illustrates operation 1004, where each of the network devices in flow path 212 is shown transmitting its respective local telemetry 218 directly to collector 112 in response to receiving a packet tagged with an INT header. The network devices in flow path 212 that transmit their telemetry include devices at endpoints of the flow path (e.g., ToR switch 1 and ToR switch 2) and the transit devices (e.g., R1, R2) along the flow path.

Returning to FIG. 10, at operation 1006, the network device can detect and report on the occurrence of dropped packets. For example, the network device can maintain dropped packet telemetry including the number of dropped packets, drop reasons, time stamps, and so on. In some embodiments, dropped packet telemetry can be included with the accessed telemetry that is transmitted to the collector per operation 1004. In other embodiments, dropped packet telemetry can be transmitted to the collector in a separate transmission independent of when the accessed telemetry is transmitted to the collector.

At operation 1008, the network device can invoke one or more monitoring processes to execute on the network device. For example, the network device can be configured with facilities that can be invoked to provide active monitoring and data collection of various activities in the network device. In some embodiments, the telemetry bits in the tagged packet can include additional bits that instruct the network device to perform monitoring when the bits are in a SET state (e.g., binary '1'). The bits can identify one or more monitoring processes to execute. Consider, for instance, the INT header INSTRUCTION BITMAP discussed above in connection with FIG. 8. A bit can be defined in the bitmap to invoke a congestion analyzer (e.g., Arista Networks' LANZ™ utility) to track interface congestion and queuing latency when the bit is SET. For instance, when the network device sees that the bit is set, the network device can instantiate an instance of the congestion analyzer to monitor and collect congestion data. Other telemetry bits can be defined in the bitmap to invoke additional monitoring facilities in the network device.

At operation 1010 the network device can report on telemetry generated from monitoring activity initiated at operation 1008, including data collected from the monitoring activity and data computed from analyses performed on the collected data; e.g., queuing delay, buffer depth, traffic class, time stamps, etc. In some embodiments, the monitoring telemetry can be included as part of the accessed telemetry that is transmitted to the collector per operation 1004. In other embodiments, the monitoring telemetry can be transmitted to the collector in a separate transmission independent of when the accessed telemetry is transmitted to the collector.

Figure 11:
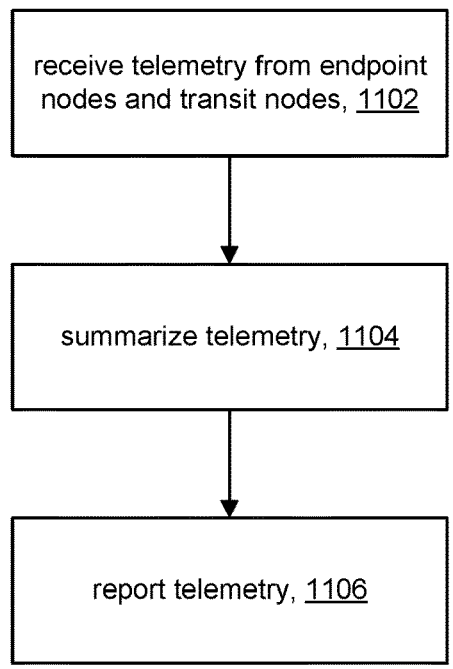
FIG. 11 shows processing in a collector in accordance with the present disclosure.

Referring to FIG. 11, the discussion will now turn to a high level description of operations and processing in accordance with the present disclosure performed by a collector (e.g., 112, FIG. 1) in a data network (e.g., 100, FIG. 1) to facilitate troubleshooting performance issues between two hosts in the data network. In some embodiments, for example, the collector can include computer executable program code, which when executed by one or more processors (e.g., 1402, FIG. 14), can cause the collector to perform processing in accordance with FIG. 11. The operation and processing blocks described below are not necessarily executed in the order shown, and can be allocated for execution among one or more concurrently executing processes and/or threads.

At operation 1102, the collector can receive telemetry directly from each network device. In accordance with the present disclosure, each network device can send its locally-generated telemetry to the collector. The network devices include endpoint devices (e.g., ToR switch 1, ToR switch 2) and intermediate (transit) devices (e.g., R1, R2). This operation can be an ongoing data collection process; each time a network device receives a tagged packet the network device can transmit its telemetry to the collector.

Figure 12:
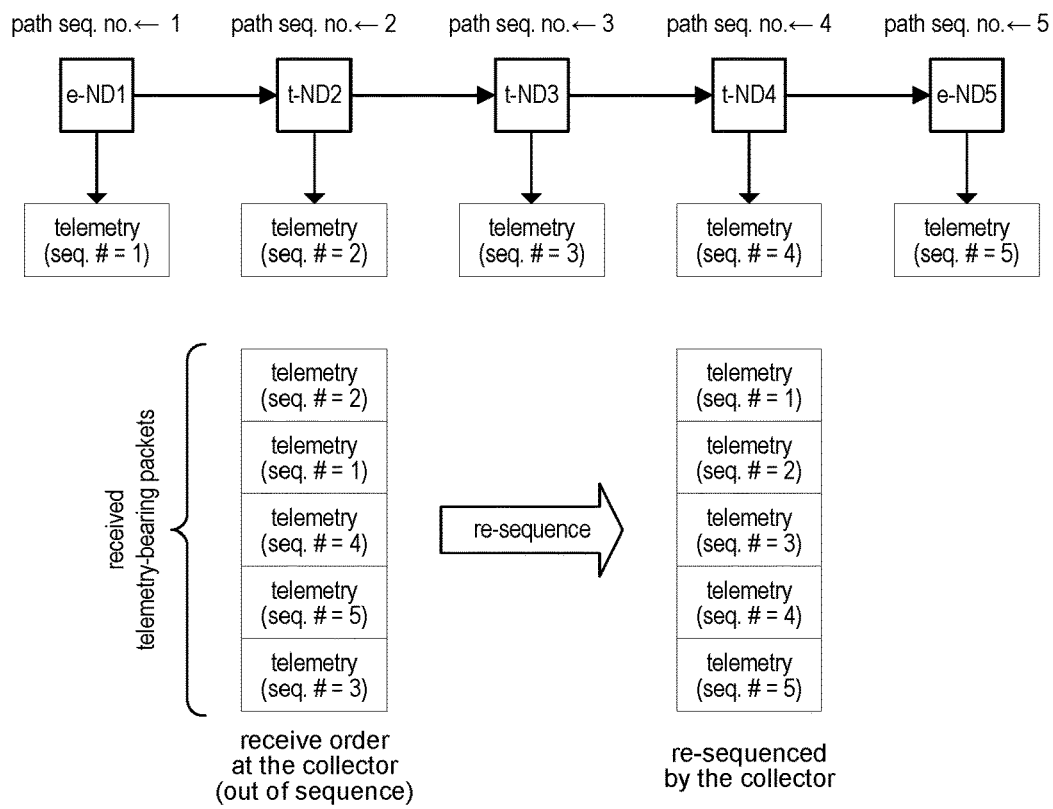
FIG. 12 shows path sequence numbers in accordance with the present disclosure.

At operation 1104, the collector can store the telemetry as it is received from each network device. Due to variable transport latency, packets containing the telemetry may arrive at the collector out of order or be dropped from the network for some reason. The path sequence number that is included with the telemetry can be used to determine the ordering of telemetry received from each network device. Recall that the path sequence number is initialized by the endpoint device and incremented by each transit device along the flow path. The path sequence numbers therefore collectively represent the order of path node traversal. The collector can use the path sequence numbers to infer the packet forwarding path even if the telemetry-bearing packets are received out of order. FIG. 12 illustrates an example, where telemetry-bearing packets received from the network devices (e.g., e-ND1, t-ND2, etc.) arrive at the collector out of sequence, and are subsequently re-sequenced by the collector according to the path sequence numbers in the packets.

At operation 1106, the collector can report the collected telemetry to a network operator. In some embodiments, the collector can report the telemetry to the user (e.g., network operator), for example, via the central controller. The telemetry can be presented in any suitable format. The network operator can use the telemetry to quickly assess if a reported performance issue is due to a problem in the network or not.

In some embodiments, the collector can receive server-type telemetry. Referring to FIG. 2, in some embodiments the Host B server can be configured to provide metrics relating to performance-related activity in the server such as CPU utilization, memory pressure, and so on. In some embodiments, the Host A server can be configured to provide performance metrics to the collector as well. In embodiments that provide server-side performance metrics to the collector in addition to the network metrics, the network operator can more readily assess whether a reported performance issue between Host A and Host B is in the network or in one of the servers.

Figure 13:
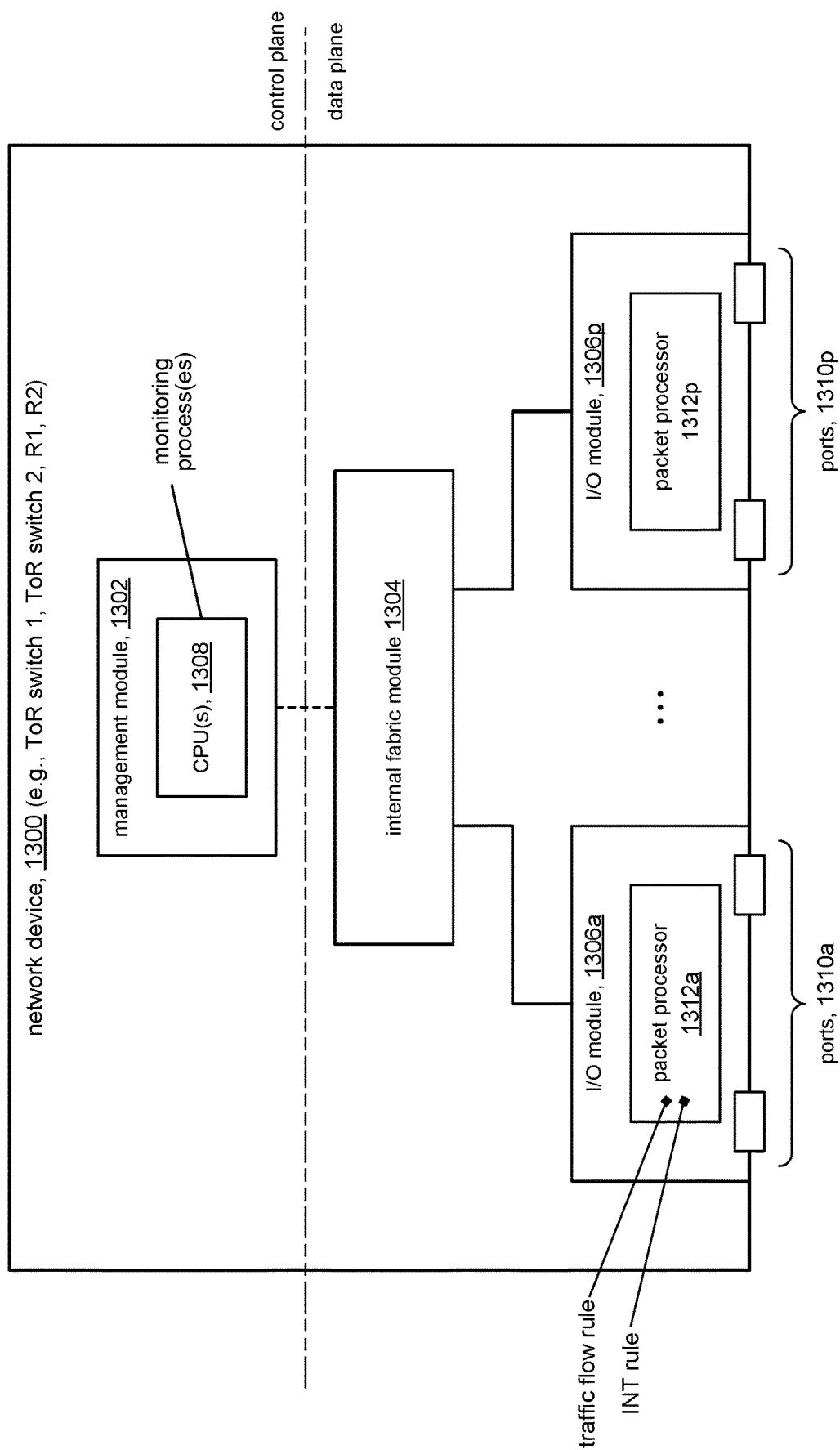
FIG. 13 is an illustrative example of a network device that can be configured in accordance with the present disclosure.

FIG. 13 depicts an example of a network device 1300 (e.g., ToR switch 1, R1, etc.) in accordance with some embodiments of the present disclosure. As shown, network device 1300 includes a management module 1302, an internal fabric module 1304, and a number of I/O modules 1306a-1306p. Management module 1302 includes the control plane (also referred to as control layer) of network device 1300 and can include one or more management CPUs 1308 for managing and controlling operation of network device 1300 in accordance with the present disclosure, including instantiating one or more monitoring processes. Management CPU 1308 can be a general purpose processor, such as an Intel®/AMD® x86 or ARM® processor, that operates under the control of software stored in a memory (not shown), such as dynamic random access memory (DRAM). Control plane refers to all the functions and processes that determine which path to use, such as routing protocols, spanning tree, and the like.

Internal fabric module 1304 and I/O modules 1306a-1306p collectively represent the data plane of network device 1300 (also referred to as data layer, forwarding plane, etc.). Internal fabric module 1304 is configured to interconnect the various other modules of network device 1300. Each I/O module 1306a-1306p includes one or more input/output ports 1310a-1310p that are used by network device 1300 to send and receive network packets.

Each I/O module 1306a-1306p can also include a respective packet processor 1312a-1312p. Each packet processor 1312a-1312p can comprise a forwarding hardware component (e.g., application specific integrated circuit (ASIC), field programmable array (FPGA), digital processing unit, graphics coprocessors, TCAM, and the like) configured to make wire speed decisions on how to handle incoming (ingress) and outgoing (egress) network packets. In accordance with some embodiments, the TCAM in a packet processor can include a traffic flow rule to identify the traffic flow of interest (FIG. 5) and an INT rule to identify tagged packets (FIG. 9). In accordance with some embodiments some aspects of the present disclosure can be performed wholly within the data plane.

Figure 14:
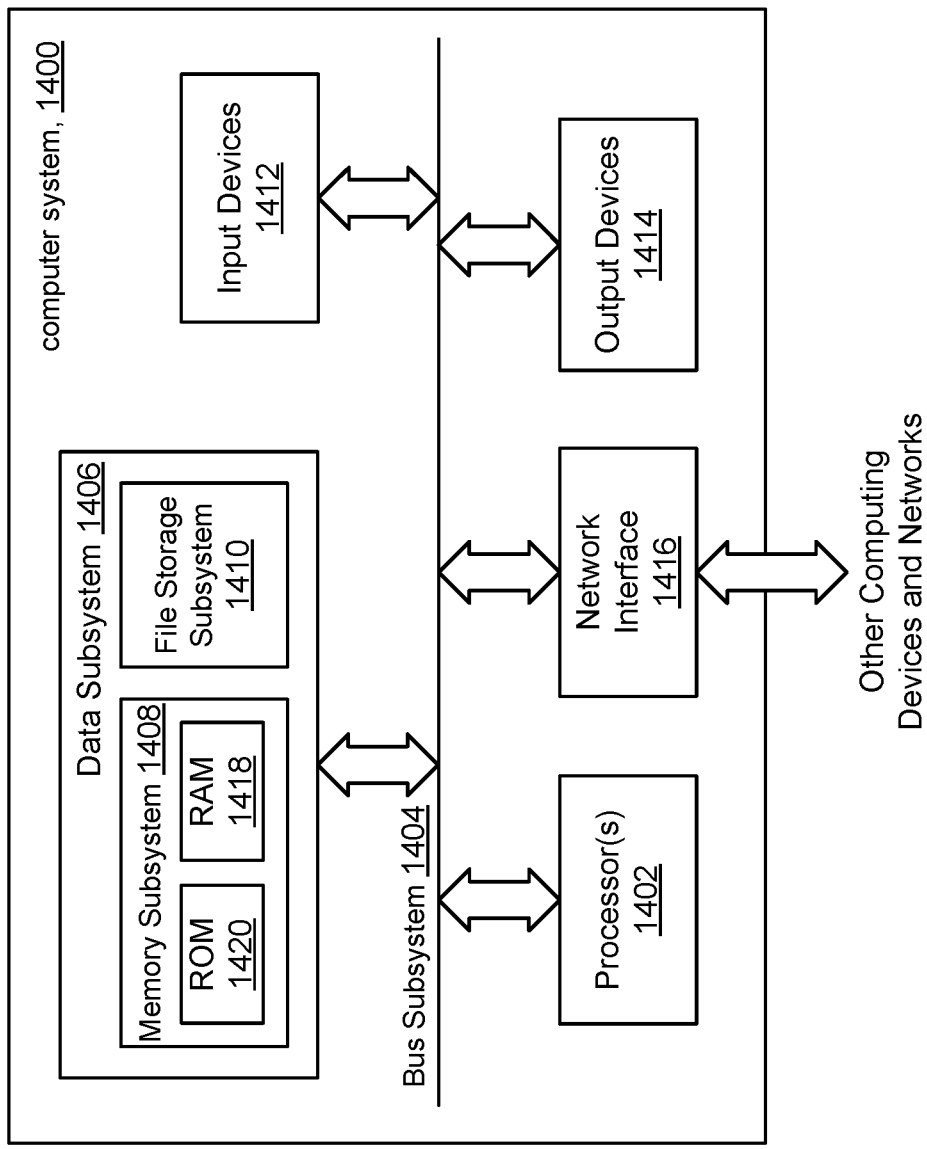
FIG. 14 is an illustrative example of a computer system that can be configured in accordance with the present disclosure.

FIG. 14 depicts a simplified block diagram of an example computer system 1400 according to certain embodiments. Computer system 1400 can be used to implement central controller 110 and collector 112 described in the present disclosure. As shown in FIG. 14, computer system 1400 includes one or more processors 1402 that communicate with a number of peripheral devices via bus subsystem 1404. These peripheral devices include data subsystem 1406 (comprising memory subsystem 1408 and file storage subsystem 1410), user interface input devices 1412, user interface output devices 1414, and network interface subsystem 1416.

Bus subsystem 1404 can provide a mechanism for letting the various components and subsystems of computer system 1400 communicate with each other as intended. Although bus subsystem 1404 is shown schematically as a single bus, alternative embodiments of the bus subsystem can utilize multiple busses.

Network interface subsystem 1416 can serve as an interface for communicating data between computer system 1400 and other computer systems or networks. Embodiments of network interface subsystem 1416 can include, e.g., an Ethernet card, a Wi-Fi adapter, etc.

User interface input devices 1412 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 1400.

User interface output devices 1414 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 1400.

Data subsystem 1406 includes memory subsystem 1408 and file/disk storage subsystem 1410 represent non-transitory computer-readable storage media that can store program code and/or data, which when executed by processor

1402, can cause processor 1402 to perform operations in accordance with embodiments of the present disclosure.

Memory subsystem 1408 includes a number of memories including main random access memory (RAM) 1418 for storage of instructions and data during program execution and read-only memory (ROM) 1420 in which fixed instructions are stored. File storage subsystem 1410 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1400 is illustrative and many other configurations having more or fewer components than system 1400 are possible.

Additional Embodiments

In accordance with some embodiments of the present disclosure, a method in a central controller for troubleshooting performance issues in an application executing on a first node that is accessed by a user on a second node includes the central controller: receiving flow parameters for traffic flow between the first node and the second node; using the flow parameters to identify network address information of a first network device and a second network device to which the first node and the second node are respectively connected; configuring the first and second network devices to tag packets that are sent over at least one network path between the first and second nodes, wherein at least one third network device among a plurality of third network devices along the at least one network path reports its device-internal metrics in response to receiving tagged packets from either the first or second network device; and receiving, as telemetry data, device-internal metrics from the at least one third network device, wherein the received telemetry data facilitates establishing or eliminating the at least one network path as a cause of the performance issues in the application.

In some embodiments, configuring the first and second network devices includes sending to the first and second network devices one or more descriptors that specify particular device-internal metrics to be provided by the at least one third network device.

In some embodiments, the method further comprises the central controller receiving, from the first network device, device-internal metrics in response to the first network device receiving tagged packets from the second network device and receiving, from the second network device, device-internal metrics in response to the second network device receiving tagged packets from the first network device.

In some embodiments, each tagged packet includes a path sequence number which is incremented by the at least one third network device and included with the local telemetry sent to the central controller, wherein the central controller uses the path sequence number to determine a forwarding sequence on the at least one network path.

In some embodiments, the method further comprises ed packet telemetry from the at least one third network device in response to the at least one third network device dropping one or more packets sent between the first and second nodes.

In some embodiments, the method further comprises the central controller receiving dropped packet telemetry from the first or second network device in response to the first or second network device dropping one or more packets sent between the first and second nodes.

In some embodiments, the tagged packets include triggering information to trigger additional processing in the at least one third network device to capture congestion metrics, wherein the received telemetry data includes the congestion metrics captured by the at least one third network device.

In accordance with some embodiments of the present disclosure, an apparatus in a data network comprises: one or more computer processors; and a computer-readable storage medium comprising instructions that operate the one or more computer processors to monitor traffic on a flow path between a first node and a second node in the data network to troubleshoot one or more performance issues between the first and second nodes. The instructions operate the one or more computer processors to: cause endpoint network devices on the flow path to tag traffic sent between the first and second nodes, wherein the endpoint network devices tag packets received from the first and second nodes with an In-band Network Telemetry (INT) based header; and receive data packets, from one or more transit network devices on the flow path between the first and second nodes, that encapsulate local telemetry in response to the one or more transit network devices receiving packets tagged by the endpoint network devices, wherein the local telemetry of each of the one or more transit network devices is selected according to telemetry bits contained in the INT-based header of a tagged packet received by said each transit network device. The received telemetry data is used to establish or eliminate network devices on the flow path between the first and second nodes as a cause of the one or more performance issues.

In some embodiments, the computer-readable storage medium further comprises instructions for controlling the one or more computer processors to: receive identifiers of the first and second nodes; and use the identifiers of the first and second nodes to determine the endpoint network devices to which the first and second nodes are connected.

In some embodiments, the computer-readable storage medium further comprises instructions for controlling the one or more computer processors to cause one endpoint network device to store a first packet processing rule that matches packets having a source address of the first node and a destination address of the second node and specifies a rewrite action that appends the INT-based header to matched packets and to cause the other endpoint network device to store a second packet processing rule that matches packets having a source address of the second node and a destination address of the first node and specifies a rewrite action that appends the INT-based header to matched packets.

In some embodiments, the computer-readable storage medium further comprises instructions for controlling the one or more computer processors to generate the first and second packet processing rules and send the generated packet processing rules to the respective endpoint devices.

In some embodiments, the computer-readable storage medium further comprises instructions for controlling the one or more computer processors to receive local telemetry of one of the endpoint network devices in response to said one of the endpoint network devices receiving a tagged packet from the other of the endpoint network devices.

In some embodiments, the computer-readable storage medium further comprises instructions for controlling the one or more computer processors to receive dropped packet telemetry from one of the one or more transit network devices when said one of the one or more transit network devices experiences a dropped packet.

In some embodiments, the dropped packet telemetry is included with the received local telemetry sent by said one of the one or more transit network devices.

In accordance with some embodiments of the present disclosure, an apparatus in a data network comprises one or more processors configured to: receive a packet, wherein the packet is tagged with an In-band Network Telemetry (INT) based header, wherein the INT-based header includes a plurality of telemetry bits; transmit, in response to receiving the packet, at least one packet comprising locally collected telemetry, selected according to the plurality of telemetry bits in the INT-based header, to a collector in the data network; and transmit the received packet to a next hop device without appending the locally collected telemetry to the INT-based header. The telemetry collected by the collector is used to troubleshoot a performance issue between a first node and a second node in the data network.

In some embodiments, the one or more processors are further configured to use a packet processing rule to determine that a received packet is tagged.

In some embodiments, the one or more processors are further configured to transmit the locally collected telemetry in a packet that has a destination address equal to an address of the collector.

In some embodiments, the one or more processors are further configured to collect telemetry for dropped packets and transmit a packet comprising dropped packet telemetry to the collector.

In some embodiments, the one or more processors are further configured to: instantiate a monitor process when one of the plurality of telemetry bits includes a monitor bit that is in a SET state; collect monitored telemetry from the monitor process; and transmit the monitored telemetry to the collector.

In some embodiments, the one or more processors are further configured to receive capability information from the next hop device, wherein the received packet is transmitted to the next hop device with the INT-based header when the capability information from the next hop device includes INT capability information, wherein the received packet is transmitted to the next hop device without the INT-based header when the capability information from the next hop device does not include INT capability information.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a central controller for troubleshooting performance issues in an application executing on a first node that is accessed by a user on a second node, the method comprising:
the central controller receiving network flow parameters from a network administrator for traffic flow between the first node and the second node;
the central controller using the network flow parameters to identify network address information of a first network device and a second network device to which the first node and the second node are respectively connected;
the central controller sending a trigger command to the first network device and to the second network device to program respective rules in the first and second network devices, the respective rules including match criteria to identify packets sent between the first and second nodes and action information to cause the first and second network devices to tag those packets, wherein at least one third network device among a plurality of third network devices along at least one network path between the first and second nodes reports its device-internal metrics in response to receiving tagged packets from either the first or second network device; and
the central controller receiving, as telemetry data, device-internal metrics from the at least one third network device and using the received telemetry data to assess whether or not the at least one network path is a cause of the performance issues in the application.

2. The method of claim 1, wherein configuring the first and second network devices includes sending to the first and second network devices one or more descriptors that specify particular device-internal metrics to be provided by the at least one third network device.

3. The method of claim 1, further comprising the central controller receiving, from the first network device, device-internal metrics in response to the first network device receiving tagged packets from the second network device and receiving, from the second network device, device-internal metrics in response to the second network device receiving tagged packets from the first network device.

4. The method of claim 1, wherein each tagged packet includes a path sequence number which is incremented by the at least one third network device and included with the local telemetry sent to the central controller, wherein the central controller uses the path sequence number to determine a forwarding sequence on the at least one network path.

5. The method of claim 1, further comprising the central controller receiving dropped packet telemetry from the at least one third network device in response to the at least one third network device dropping one or more packets sent between the first and second nodes.

6. The method of claim 5, further comprising the central controller receiving dropped packet telemetry from the first or second network device in response to the first or second network device dropping one or more packets sent between the first and second nodes.

7. The method of claim 1, wherein the tagged packets include triggering information to trigger additional processing in the at least one third network device to capture congestion metrics, wherein the received telemetry data includes the congestion metrics captured by the at least one third network device.

8. An apparatus in a data network, the apparatus comprising:
one or more computer processors; and
a non-transitory computer-readable storage medium comprising executable program instructions that operate the one or more computer processors to monitor traffic on a flow path between a first node and a second node in the data network to troubleshoot one or more performance issues between the first and second nodes, wherein the instructions operate the one or more computer processors to:
send a trigger command to endpoint network devices on the flow path to program respective rules in the endpoint network devices, the respective rules including match criteria to identify packets sent between the first and second nodes and action information to cause the endpoint network devices to tag traffic sent between the first and second nodes, wherein the endpoint network devices tag the packets with an In-band Network Telemetry (INT) based header; and receive data packets, from one or more transit network devices on the flow path between the first and second nodes, that encapsulate local telemetry in response to the one or more transit network devices receiving packets tagged by the endpoint network devices, wherein the local telemetry of each of the one or more transit network devices is selected according to telemetry bits contained in the INT-based header of a tagged packet received by said each transit network device, wherein the received telemetry data is used to assess whether or not network devices on the flow path between the first and second nodes are a cause of the one or more performance issues.

9. The apparatus of claim 8, wherein the non-transitory computer-readable storage medium further comprises instructions for controlling the one or more computer processors to:

receive identifiers of the first and second nodes; and use the identifiers of the first and second nodes to determine the endpoint network devices to which the first and second nodes are connected.

10. The apparatus of claim 8, wherein the respective rules include a first packet processing rule and a second packet processing rule, wherein the non-transitory computer-readable storage medium further comprises instructions for controlling the one or more computer processors to cause one endpoint network device to store the first packet processing rule that matches packets having a source address of the first node and a destination address of the second node and specifies a rewrite action that appends the INT-based header to matched packets and to cause the other endpoint network device to store the second packet processing rule that matches packets having a source address of the second node and a destination address of the first node and specifies a rewrite action that appends the INT-based header to matched packets.

11. The apparatus of claim 10, wherein the non-transitory computer-readable storage medium further comprises instructions for controlling the one or more computer processors to generate the first and second packet processing rules and send the generated packet processing rules to the respective endpoint devices.

12. The apparatus of claim 8, wherein the non-transitory computer-readable storage medium further comprises instructions for controlling the one or more computer processors to receive local telemetry of one of the endpoint network devices in response to said one of the endpoint network devices receiving a tagged packet from the other of the endpoint network devices.

13. The apparatus of claim 8, wherein the non-transitory computer-readable storage medium further comprises instructions for controlling the one or more computer processors to receive dropped packet telemetry from one of the one or more transit network devices when said one of the one or more transit network devices experiences a dropped packet.

14. The apparatus of claim 13, wherein the dropped packet telemetry is included with the received local telemetry sent by said one of the one or more transit network devices.

15. An apparatus in a data network, the apparatus comprising one or more processors configured to:

store a packet processing rule comprising match criteria to identify packets containing an In-band Network Telemetry (INT) based header;

receive a packet;

detect, using the packet processing rule, that the packet is tagged with the INT-based header, wherein the INT-based header includes a plurality of telemetry bits;

transmit, in response to receiving the packet, at least one packet comprising locally collected telemetry, selected according to the plurality of telemetry bits in the INT-based header, to a collector in the data network; and transmit the received packet to a next hop device without appending the locally collected telemetry to the INT-based header;

instantiate a monitor process when one of the plurality of telemetry bits includes a monitor bit that is in a SET state;

collect monitored telemetry from the monitor process; and transmit the monitored telemetry to the collector, wherein telemetry collected by the collector is used to troubleshoot a performance issue between a first node and a second node in the data network.

16. The apparatus of claim 15, wherein the one or more processors are further configured to transmit the locally collected telemetry in a packet that has a destination address equal to an address of the collector.

17. The apparatus of claim 15, wherein the one or more processors are further configured to collect telemetry for dropped packets and transmit a packet comprising dropped packet telemetry to the collector.

18. The apparatus of claim 15, wherein the one or more processors are further configured to receive capability information from the next hop device, wherein the received packet is transmitted to the next hop device with the INT-based header when the capability information from the next hop device includes INT capability information, wherein the received packet is transmitted to the next hop device without the INT-based header when the capability information from the next hop device does not include INT capability information.

* * * * *